(12) United States Patent  
Kapur et al.

(10) Patent No.: US 8,913,809 B2  
(45) Date of Patent: Dec. 16, 2014

(54) MONITORING PHYSICAL BODY CHANGES VIA IMAGE SENSOR

(75) Inventors: Jay Kapur, Redmond, WA (US); Todd Ferkingstad, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 272 days.

(21) Appl. No.: 13/495,863

(22) Filed: Jun. 13, 2012

(65) Prior Publication Data

US 2013/0336550 A1     Dec. 19, 2013

(51) Int. Cl.
*G06K 9/00*     (2006.01)

(52) U.S. Cl.
USPC .......................................... 382/128; 382/154

(58) Field of Classification Search
None
See application file for complete search history.

(56) References Cited

U.S. PATENT DOCUMENTS

| | | | |
|---|---|---|---|
| 7,693,584 | B2 | 4/2010 | Pryor et al. |
| 2010/0167823 | A1* | 7/2010 | Winkler ........................ 463/42 |
| 2010/0195867 | A1 | 8/2010 | Kipman et al. |
| 2011/0210915 | A1 | 9/2011 | Shotton et al. |
| 2011/0211754 | A1 | 9/2011 | Litvak et al. |
| 2011/0270135 | A1 | 11/2011 | Dooley et al. |

OTHER PUBLICATIONS

Leyvand, Tommer, et al. "Kinect identity: Technology and experience." Computer 44.4 (2011): 94-96.*

Weiss, Alexander, David Hirshberg, and Michael J. Black. "Home 3D body scans from noisy image and range data." Computer Vision (ICCV), 2011 IEEE International Conference on. IEEE, 2011.*

Velardo, Carmelo, and J. Dugelay. "Weight estimation from visual body appearance." Biometrics: Theory Applications and Systems (BTAS), 2010 Fourth IEEE International Conference on. IEEE, 2010.*

Vera, et al., "Augmented Mirror: Interactive Augmented Reality System Based on Kinect", Retrieved at <<http://smagris3.uv.es/irtic/sites/default/files/AugmentedMirror.pdf>>, International Federation for Information Processing, 2011, pp. 483-486.

Shotton, et al., "Real-Time Human Pose Recognition in Parts from Single Depth Images", Retrieved at <<http://ieeexplore.ieee.org/stamp/stamp.jsp?tp=&arnumber=5995316>>, IEEE Computer Vision and Pattern Recognition, Jun. 21-25, 2011, pp. 8.

Xia, et al., "Human Detection Using Depth Information by Kinect", Retrieved at <<http://ieeexplore.ieee.org/stamp/stamp.jsp?tp=&arnumber=5981811>>, IEEE CVPRW, Jun. 20-25, 2011, pp. 15-22.

Aron, Jacob, "Kinect weighs astronauts just by looking at them," New Scientist, Magazine issue 2844, <http://www.newscientist.com/article/mg21228443.700-kinect-weighs-astronauts-just-by-looking-at-them.html>, Dec. 23, 2011, 2 pages.

* cited by examiner

*Primary Examiner* — Bhavesh Mehta
*Assistant Examiner* — Andrew Moyer
(74) *Attorney, Agent, or Firm* — Aaron Chatterjee; Kate Drakos; Micky Minhas

(57) ABSTRACT

Embodiments related to monitoring physical body changes over time are disclosed. One embodiment provides a computing device configured to receive a depth image representing an observed scene comprising a user and detect a representation of the user in the depth image. The computing device is further configured to determine an adjusted body model based on a comparison between an initial body model and the representation of the user, and output to a display device a representation of the adjusted body model.

15 Claims, 4 Drawing Sheets

MONITORING PHYSICAL BODY CHANGES VIA IMAGE SENSOR

BACKGROUND

Monitoring of changes in body size and shape over time may be useful in determining overall health. For example, observing body changes over time may be used in gauging success of a diet or exercise program. Similarly, monitoring changes during pregnancy, before and after a surgery, or during medical treatment may be a useful diagnostic tool.

SUMMARY

Embodiments are disclosed that relate to monitoring physical body changes over time via images received from a depth image sensor. For example, one disclosed embodiment provides a computing device configured to receive a depth image representing an observed scene comprising a user, and to detect a representation of the user in the depth image. The computing device is further configured to determine an adjusted body model based on a comparison between an initial body model and the representation of the user, and output to a display device a representation of the adjusted body model.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

As mentioned above, monitoring physical body changes over time may provide valuable information in a number of scenarios. Changes in body size and/or shape may be used to determine the success of an exercise program, diet, or health regimen. Monitoring changes may also be useful for diagnosing, or reviewing treatment of, one or more health conditions (e.g., pregnancy, surgery, etc.).

Currently, a person interested in tracking body changes over time may take a series of 2D photos and/or manual measurements (e.g., via a tape measure and/or body calipers). However, such approaches may be qualitative and prone to human error, and thus may result in incomplete and/or unreliable readings. As such, it may be difficult to quantitatively observe long-term trends using such manual techniques.

Therefore, embodiments are disclosed herein that may facilitate monitoring of changes in body size and shape. Briefly, the disclosed embodiments employ a depth camera and potentially other imaging sensors to monitor physical body changes over time.

The use of a depth camera may help to provide a thorough understanding of body changes over time by providing a rich dataset from which one or more trends may be determined. The data from the depth camera can be compared over various periods of time, and can be presented via various representations. Data from a depth camera also may allow the extraction of body measurements (e.g., waist, arm, and leg circumference) more accurately and/or precisely than manual techniques.

Figure 1:
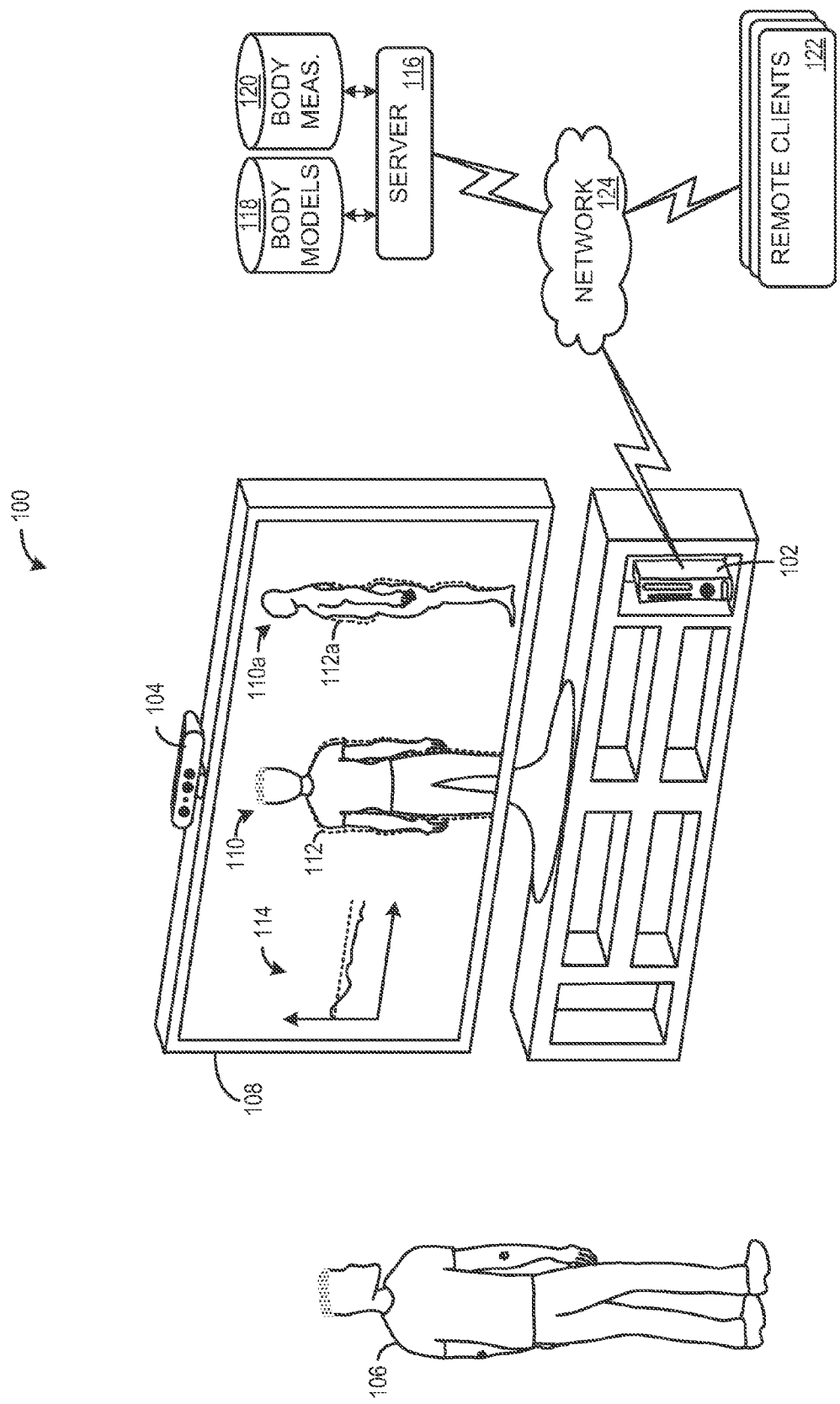
FIG. 1 shows an embodiment of an example use environment for monitoring physical body changes over time.

FIG. 1 shows an embodiment of an example use environment 100 for monitoring physical body changes over time. Use environment 100 comprises a user client 102 that is configured to receive inputs from one or more imaging sensors 104 configured to image user 106. Imaging sensors 104 may be configured to provide depth image data, and also two-dimensional image data in some embodiments to user client 102. In order to monitor physical body changes of user 106 via depth images, user client 102 and/or imaging sensors 104 may utilize all or part of a skeletal tracking pipeline. An example pipeline will be discussed later in reference to FIG. 2.

Although user 106 is illustrated as in a standing position facing imaging sensors 104, it will be understood that user client 102 may be configured to analyze depth images of user 106 in any suitable pose. For example, user client 102 may be configured to analyze depth images of user 106 while in a natural pose, rather than in a specific pre-defined pose. In other embodiments, user client 102 may be configured to analyze depth images of user 106 in one or more pre-defined poses and/or motions. For example, imaging sensors 104 may be configured to image user 106 while user 106 spins, stands facing imaging sensors 104, stands in profile to imaging sensors 104 and/or performs one or more other pre-defined motions and/or poses.

User client 102 may be configured to acquire and analyze image data of user 106 at any suitable frequency. For example, in some embodiments, the user client 102 may acquire image data of user 106 at the will of the user. In other embodiments, the user client 102 may acquire image data of the user 106 at a regular interval, such as daily, weekly, bi-weekly, monthly, or on any other suitable interval. In yet other embodiments, the computing device may be configured to acquire image data of the user 106 when the user is interacting with the image sensors 104 during other activities (e.g. game play).

User client 102 further may be configured to provide alerts to user 106 to remind user 106 to pose for body shape image data acquisition. Such notifications may take any suitable form. For example, user client 102 may be configured to display an audible and/or visual notification via output devices associated with user client 102, to send an electronic message (e.g., SMS message, social network post, etc.) or to provide any other suitable notification or combination of notifications. It will be understood that these scenarios are presented for the purpose of example, and are not intended to be limiting in any manner.

FIG. 1 also illustrates an embodiment of a display device 108 operatively connected to user client 102. Display device 108 is shown displaying an avatar 110 representing user 106. Avatar 110 may represent a current body shape of the user 106, and also may represent changes in the body shape of the user 106 over time. For example, avatar 110 may be used to display an animated representation of changes in the user's body shape based on prior body shape data of the user.

A shape of avatar 110 may be determined in any suitable manner. For example, as discussed in greater detail below, in some embodiments a shape of avatar 110 may be based on a virtual body model that is adjusted to fit an observed shape of user 106 from depth image data. The virtual body model as adjusted may be referred to herein as an adjusted body model. Further, the pose and/or motion of avatar 110 may be controllable by a user. For example, the avatar may substantially mirror the pose and motion of user 106 so that the user can select easily place the avatar in a desired pose to view body shape from a particular angle. Likewise, a user may be able to control an orientation, pose, etc, of avatar 110 via gesture-based inputs, voice inputs, or in any other suitable manner. While illustrated as an image of user 106 based on a pre-configured avatar associated with the user, it will be understood that avatar 110 may comprise any suitable appearance (e.g., image from sensors 104, cartoon character, fantasy character, animal, and/or wire-frame model, and/or combination thereof) without departing from the scope of the present disclosure.

As mentioned above, user client 102 may be further configured to provide a comparison 112 of the user's body shape over time to user 106 via display device 108. Such a comparison may be displayed in any suitable manner. For example, a comparison 112 may comprise a "before and after" visual representation of body shape and size at two or more points in time using avatar 110. In the depicted embodiment, comparison 112 comprises a baseline representation of user 106, illustrated as a dashed line, in conjunction with a current representation, illustrated as a solid line. In some embodiments, comparison 112 may comprise one or more overlays (e.g., avatars and/or other representations of the adjusted body models) and/or generated features (e.g., outlines). It will be understood that comparison 112 may comprise a comparison between any number and type of data recorded and/or computed over any period of time.

In some embodiments, a comparison may be presented as a time-varying representation of an avatar (e.g., avatar 110). For example, the comparison may be presented as a "time-lapse" animation of avatar 110 configured to illustrate changes in the shape of user 106 over time. This may help to clearly convey user progress, for example, in a weight loss program. In yet other embodiments, the comparison may comprise a time-lapse representation of depth images of user 106 from sensors 104, as opposed to or in addition to the time-lapse representation of avatar 110. In yet other embodiments, the comparison may further comprise a time-lapse representation comprising one or more visible light images (e.g., images captured via imaging sensors 104) of user 106. It will be understood that these representations of comparisons between the shape and/or size of the body of user 106 are presented for the purpose of example, and are not intended to be limiting in any manner.

Further, as illustrated in FIG. 1, in some embodiments, two or more avatar views may be shown to allow user 106 to view the shape of the avatar from a wider range of perspectives. For example, in the depicted embodiment, user client 102 may be configured to output images of avatar 110a and comparison 112a in a profile view to complement the images of avatar 110 and comparison 112. Although illustrated as being of similar representation types, in some cases avatar 110a and comparison 112a may comprise different representation types than avatar 110 and comparison 112, respectively. For example, comparison 112 may comprise a ghost image while comparison 112a may comprise a dotted outline. It will be understood that these scenarios are presented for the purpose of example, and that avatars 110 and 110a and comparisons 112 and 112a may comprise any suitable configuration without departing from the scope of the present disclosure.

User client 102 may be further configured to provide quantitative measurement feedback 114 via display device 108. As will be discussed in greater detail below, user client 102 may be configured to extract one or more body measurements (e.g., waist, arm, and/or leg circumference) of user 106 from depth image data. Quantitative measurement feedback 114 may provide a more quantitative picture of user progress than comparison 112. While illustrated as a graph representing a single measurement (e.g., waist circumference), it will be understood that feedback 114 may comprise any type and number of measurements, and may further comprise any suitable visual representation thereof. It will be further understood that although illustrated as being provided via separate areas of display device 108, in some embodiments comparison 112 and quantitative measurement feedback 114 may at least partially overlap (e.g., via one or more overlays). For example, one or more metrics (e.g., body measurements, change in body measurements) may be displayed on or next to corresponding features of avatar 110.

Use environment 100 may further comprise a network-accessible server 116. Server 116 may be configured, for example, to store one or more body models 118, body measurements 120 generated therefrom for one or more users, and/or any other suitable information (e.g. depth image data). As mentioned above, body models and body measurements will be discussed in greater detail below in reference to FIGS. 2 and 3.

In some embodiments, user client 102 may comprise a client in communication with a network-accessible server 116. Likewise, use environment 100 may further comprise other network-connected clients 122 each in communication with one or more depth image sensors and also with server 116. For example, a client 122 may be located at a workplace or other location of user 106. As another example, clients 122 may be located in homes of friends of user 106. In such an environment, clients 122 may be configured to allow social interaction between user 106 and other users. For example, clients 122 in conjunction with user client 102 and/or server 116 may be configured to provide a multi-user event, such as a weight loss challenge.

It will be understood that above-described functions of server 116 also may be performed, in whole or in part, by user client 102 and/or remote clients 122 in a peer-to-peer arrangement. User client 102, remote clients 122, and server 116 may be communicatively coupled via network 124. Network 124 may comprise any combination of networks and/or subnetworks configured to provide bidirectional communication.

Figure 2:
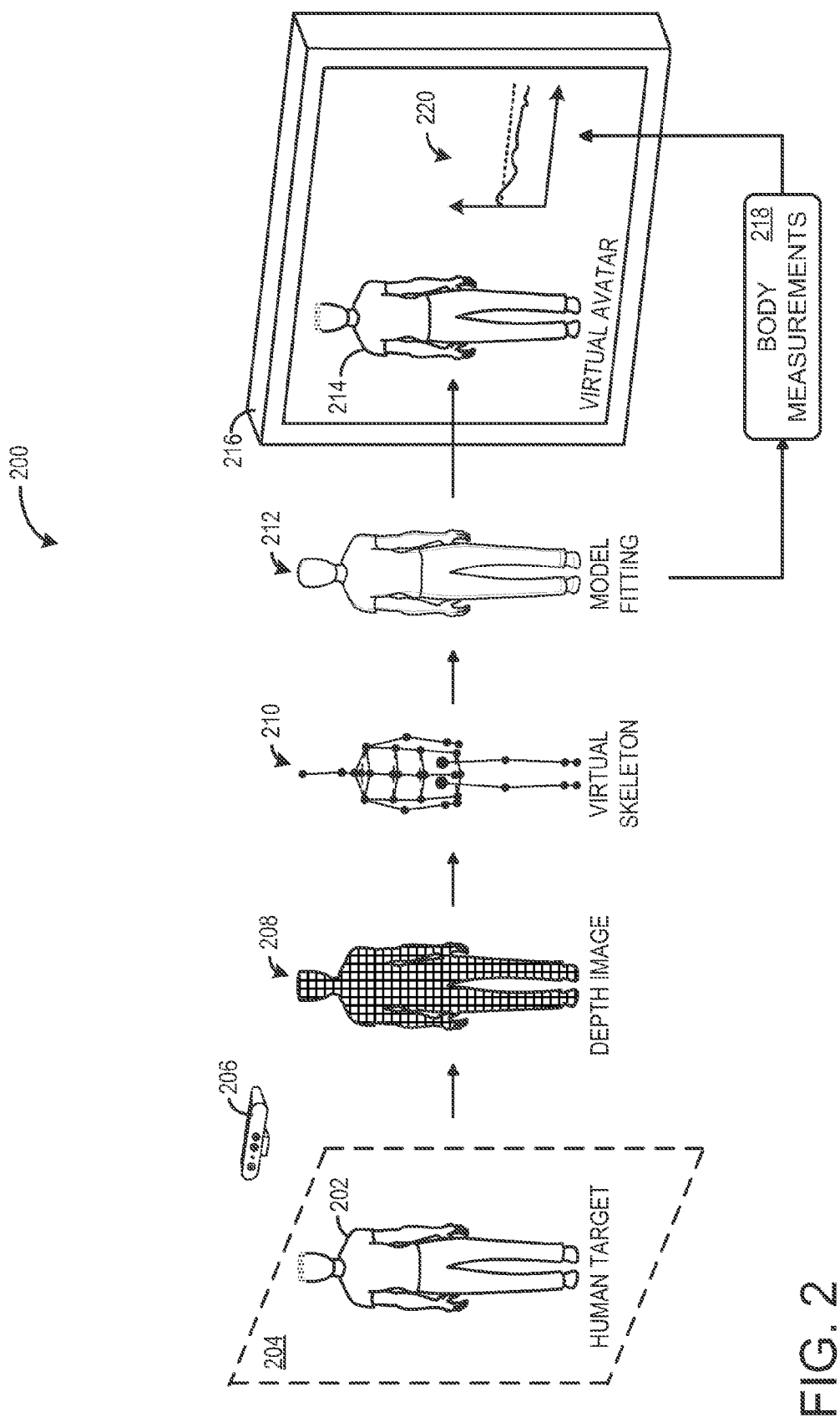
FIG. 2 shows an example embodiment of a processing pipeline for monitoring body size and shape.

FIG. 2 shows an example embodiment of a pipeline 200 for monitoring body size and shape. The three-dimensional appearance of human subject 202 (e.g., user 106 of FIG. 1) and the rest of an observed scene 204 around human subject 202 may be imaged by one or more sensors 206 (e.g., imaging sensors 104 of FIG. 1). The sensors may be configured to determine, for example, a three dimensional depth map of each surface within observed scene 204.

The three dimensional depth information determined for each pixel may be used to generate depth image 208. Such a depth image may take the form of virtually any suitable data structure, including but not limited to a matrix that includes a depth value for each pixel of the observed scene. Depth image 208 is schematically illustrated as a pixelated grid of the silhouette of human subject 202 and the remainder of observed scene 204. This illustration is for simplicity of understanding, rather than technical accuracy. It is to be understood that a depth image may include depth information for each individual pixel, or any other suitable representation of depth information.

While described as a single depth image, it will be understood that depth image 208 may comprise one or more individual depth images. For example, sensors 206 may be configured to capture a series of depth images (e.g., over a defined period of time and/or during user performance of a pre-defined position/motion) in order to provide a more accurate representation of human subject 202, such as to capture images of human subject 202 at different aspects.

Virtual skeleton 210 may be derived from depth image 208 to provide a machine readable representation of human subject 202. In other words, virtual skeleton 210 is derived from depth image 208 to model the human subject 202. Virtual skeleton 210 may be derived from depth image 208 in any suitable manner. For example, one or more skeletal fitting algorithms may be applied to depth image 208.

Virtual skeleton 210 may include a plurality of joints, and each joint may correspond to a portion of human subject 202. Virtual skeletons in accordance with the present disclosure may include virtually any number of joints, each of which can be associated with virtually any number of parameters (e.g., three dimensional joint position, joint rotation, body posture of corresponding body part (e.g., hand open, hand closed, etc.) etc.). It is to be understood that a virtual skeleton may take the form of a data structure including one or more parameters for each of a plurality of skeletal joints (e.g., a joint matrix including an x position, a y position, a z position, and a rotation for each joint). In some embodiments, other types of virtual skeletons may be used (e.g., a wireframe, a set of shape primitives, etc.).

Adjusted body model 212 (illustrated as a solid outline) may be derived from skeleton 210 in any suitable manner. For example, in some embodiments, an initial body model (illustrated as a dashed outline) may be adjusted to fit the observed shape of human subject 202. In some embodiments, a single initial body model may be used as a model for all users, while in other embodiments, an initial body model may be selected from a plurality of pre-defined body models based on skeleton 210. The use of multiple body models may facilitate a body model fitting process, as a body model-fitting process may be less computationally intensive where the initial body model is a closer fit proportionally to an adjusted body model. Any suitable number and type of body models may be used. For example in some embodiments, different body models may be used for men, women, and various age ranges of children, due to differences in body proportionalities. Body models also may be tailored for various parameters including, but not limited to, gender, weight, and height. In such an embodiment, one or more measurements may be determined from skeleton 210 and/or depth image 208, and an initial body model may then be selected based on the determined measurements.

Once the initial body model has been determined, the initial body model may be adjusted, for example, by changing proportions, shrinking muscle, adding bulk, and the like, to determine adjusted body model 212. Adjusting the initial body model may comprise multiple iterations of adjustments, and may comprise one or more comparisons with depth image 208 and/or skeleton 210. For example, in some embodiments, the body model may comprise a plurality of 3D points in space utilized to produce a 3D parameterized model. In other embodiments, any other suitable types of models may be used. It will be further understood that the initial body model may be adjusted via any suitable fitting and/or optimization mechanism or combination of mechanisms.

Virtual avatar 214 (e.g., avatar 110 of FIG. 1) may be generated from virtual skeleton 210 and/or adjusted body model 212 and displayed on display device 216 (display device 108 of FIG. 1). As described above in reference to avatar 110 of FIG. 1, avatar 214 may comprise any suitable appearance (e.g., humanoid, animal, fantasy character) and/or style (e.g., cartoon, wire-frame model). In some embodiments, avatar 214 may comprise one or more features (e.g., skin, face, and/or clothing) of human subject 202 captured via sensors 206.

Further, one or more body measurements 218 may be determined from adjusted body model 212. For example, body measurements 218 may comprise waist circumference, arm circumference, etc. Body measurements 218 may further comprise an estimated user weight (e.g., computed via one or more volume estimation mechanisms). As mentioned above and as will be discussed in greater detail below, such body measurements may then be stored, analyzed, compared, or otherwise utilized to provide richer monitoring of changes in body size and shape. For example, body measurements 218 may be utilized to provide quantitative feedback 220 (e.g., quantitative feedback 114 of FIG. 1) via display device 216. As described above, the quantitative feedback 114 may comprise any suitable appearance and may be provided via any portion of the display area of display device 216.

It will be understood that pipeline 200 is presented for the purpose of example and is not intended to be limiting in any manner. For example, the present disclosure is compatible with virtually any skeletal modeling techniques. Furthermore, in some embodiments, different and/or additional pipeline stages may be utilized without departing from the scope of the present disclosure. For example, one or more pipeline stages may be configured to correct for clothing that may lead to an inaccurate user silhouette, such as non-form fitting clothing.

Figure 3:
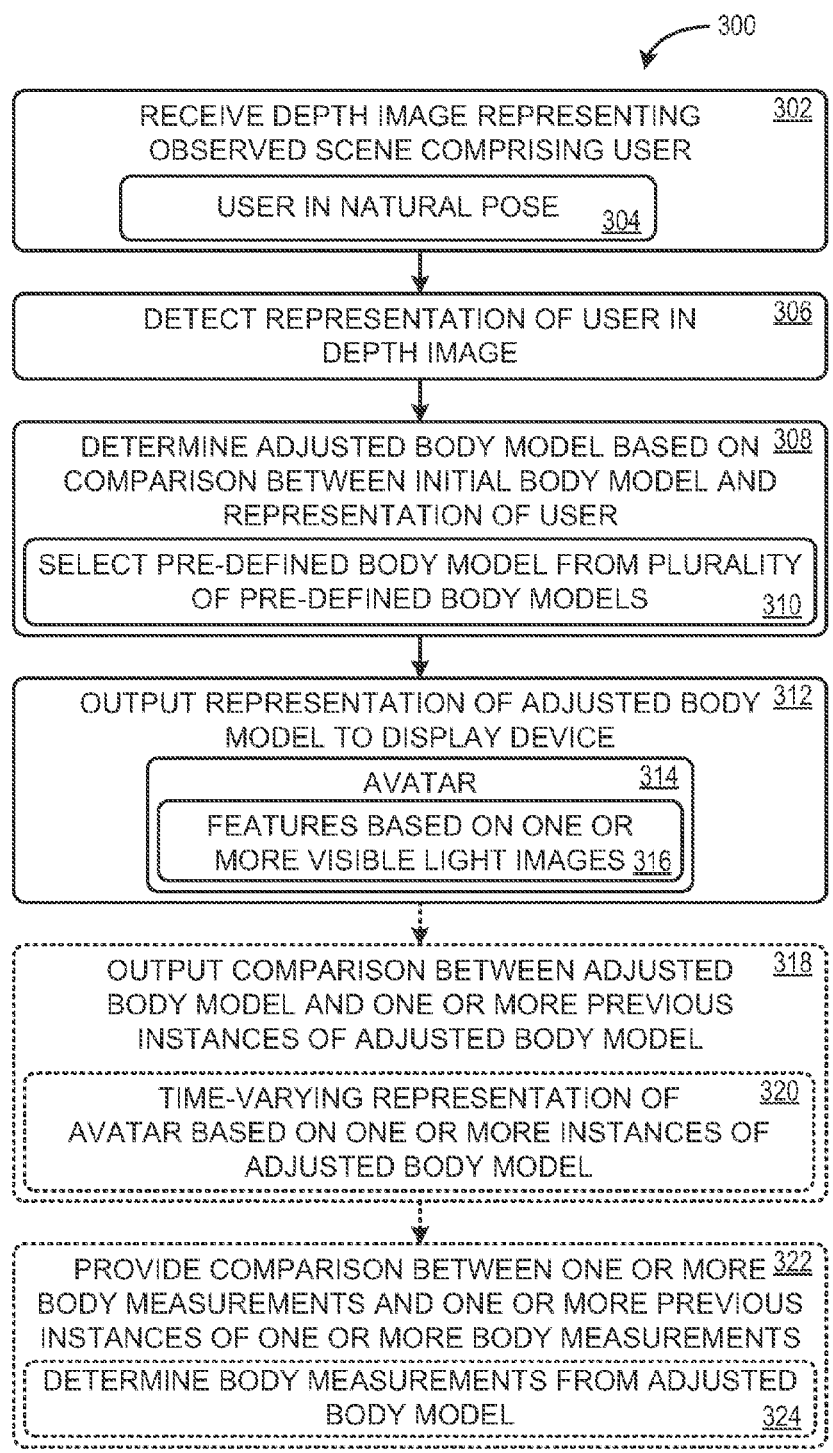
FIG. 3 shows a process flow depicting an embodiment of a method for monitoring physical body changes over time.

FIG. 3 shows a process flow depicting an embodiment of a method 300 for monitoring physical body changes over time via a computing device, such as user client 102 of FIG. 1. Method 300 comprises, at 302, receiving a depth image representing an observed scene comprising a user. As mentioned above with reference to FIG. 2, a plurality of depth images may be acquired, for example, by capturing images in various pre-defined poses and/or at various intervals while a user performs a pre-defined motion, such as a spin. Likewise, in some embodiments, the depth image may be acquired while the user is in a natural pose 304. In some embodiments, said pre-defined motions and/or poses may be configured to trigger the capture of the depth image, while in other embodiments, any other suitable trigger may be used.

At 306, method 300 comprises detecting a representation of the user in the depth image. Any suitable process may be used to detect the representation of the user in the depth image. For example, as described above with respect to FIG. 2, a depth image analysis pipeline, such as pipeline 200, may be used. Further, in some embodiments, other data, such as a visible light image, may also be received and analyzed.

At 308, method 300 comprises determining an adjusted body model based on comparison between an initial body model and the representation of the user. In some embodiments, this may comprise selecting an initial pre-defined body model from a plurality of pre-defined body models, as described above, while in other embodiments, all users may be it based upon a same initial body model.

The adjusted body model may be determined from the initial body model in any suitable manner. For example, producing an adjusted body model may comprise changing, adding or removing muscle and/or bulk, and/or performing any other suitable adjustments to the initial body model based on a comparison with the initial representation of the user in the depth image.

At 312, method 300 comprises outputting a representation of the adjusted body model to a display device. As described above, the representation of the adjusted body model may comprise an avatar 314, such as those described above with respect to FIGS. 1 and 2. As described above, avatar 314 may comprise any suitable appearance. For example, avatar 314 may comprise one or more features 316 of the user (e.g., user 106 of FIG. 1) based on one or more visible light images captured via an imaging sensors (e.g., imaging sensor 104 of FIG. 1). Such features may include one or more texture-mapped and/or other user-specific features, such as skin, face, and/or clothing representations. Avatar 314 may be controllable by the user. For example, avatar 314 may mirror the pose of the user, and/or may be controllable via gestures, voice, and/or other inputs made by the user.

At 318, method 300 may comprise outputting a representation of a comparison between the adjusted body model and one or more previous instances of the body model. Any suitable comparison may be output. For example, such a comparison may comprise a "before and after" visual representation of body shape and size comprising one or more one or more overlays (e.g., avatars and/or other representations of adjusted body models) and/or generated features (e.g., outlines). Such a comparison also may be represented as a time-varying representation 320 of the avatar based on one or more instances of the adjusted body model. Such a time-lapsed comparison may be displayed in any suitable manner. As one example, a time-lapsed comparison may be displayed as a partially transparent "ghost image" over all or part of avatar 314 as the user moves. As another example, changes may be shown by changing the shape of avatar 314.

In addition to the comparison shown via avatar 314, method 300 may comprise, at 322, providing a comparison between one or more body measurements and one or more previous instances of the one or more body measurements. This may further comprise, at 324, determining the body measurements from the adjusted body model, and storing the measurements along with the adjusted body model. In other embodiments, the one or more previous instances of the body measurements may be determined as needed from previous and current instances of the adjusted body model. Such an "on-demand" configuration may be utilized, for example, when storage space is limited.

The comparison between one or more body measurements and one or more previous instances of the one or more body measurements may be provided via any suitable mechanism or combination of mechanisms. For example, the comparison may comprise a graph or chart, as illustrated by measurement feedback 114 of FIG. 1. In other embodiments, the comparison may comprise one or more generated visual features provided in addition to an avatar. For example, the comparison may comprise an overlay, such as an overlay representing measurement locations and values, displayed over corresponding features of the avatar. It will be understood that these scenarios have been presented for the purpose of example, and are not intended to be limiting in any manner.

In some embodiments, the above described methods and processes may be tied to a computing system including one or more computers. In particular, the methods and processes described herein may be implemented as a computer application, computer service, computer API, computer library, and/or other computer program product.

Figure 4:
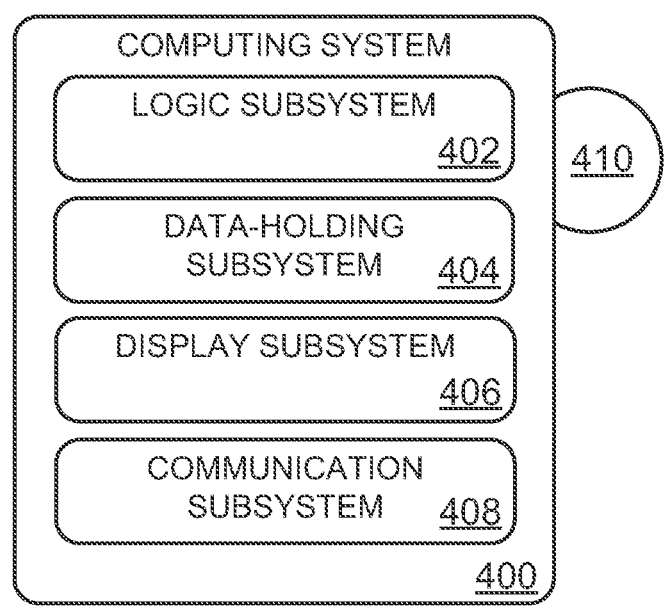
FIG. 4 schematically shows a computing device in accordance with an embodiment of the present disclosure.

FIG. 4 schematically shows a non-limiting computing system 400 that may perform one or more of the above described methods and processes. User client 102 and server 116 of FIG. 1 are non-limiting examples of computing system 400. Computing system 400 is shown in simplified form. It is to be understood that virtually any computer architecture may be used without departing from the scope of this disclosure. In different embodiments, computing system 400 may take the form of a mainframe computer, server computer, desktop computer, laptop computer, tablet computer, home entertainment computer, network computing device, mobile computing device, mobile communication device, gaming device, etc.

Computing system 400 includes a logic subsystem 402 and a data-holding subsystem 404. Computing system 400 may optionally include a display subsystem 406, communication subsystem 408, and/or other components not shown in FIG. 4. Computing system 400 may also optionally include user input devices such as keyboards, mice, game controllers, cameras, microphones, and/or touch screens, for example.

Logic subsystem 402 may include one or more physical devices configured to execute one or more instructions. For example, the logic subsystem may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Data-holding subsystem 404 may include one or more physical, non-transitory, devices configured to hold data and/or instructions executable by the logic subsystem to implement the herein described methods and processes. When such methods and processes are implemented, the state of data-holding, subsystem 404 may be transformed (e.g., to hold different data).

Data-holding subsystem 404 may include removable media and/or built-in devices. Data-holding subsystem 404 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Data-holding subsystem 404 may include devices with one or more of the following characteristics: volatile, nonvolatile, dynamic, static, read/write, read-only, random access, sequential access, location addressable, file addressable, and content addressable. In some embodiments, logic subsystem 402 and data-holding subsystem 404 may be integrated into one or more common devices, such as an application specific integrated circuit or a system on a chip.

FIG. 4 also shows an aspect of the data-holding subsystem in the form of removable computer-readable storage media 410, which may be used to store and/or transfer data and/or instructions executable to implement the herein described methods and processes. Removable computer-readable storage media 410 may take the form of CDs, DVDs, HD-DVDs, Blu-Ray Discs. EEPROMs, and/or floppy disks, among others.

It is to be appreciated that data-holding subsystem 404 includes one or more physical, non-transitory devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

When included, display subsystem 406 may be used to present a visual representation of data held by data-holding subsystem 404. As the herein described methods and processes change the data held by the data-holding subsystem, and thus transform the state of the data-holding subsystem, the state of display subsystem 406 may likewise be transformed to visually represent changes in the underlying data. Display subsystem 406 may include one or more display devices utilizing virtually any type of technology. Such display devices may be combined with logic subsystem 402 and/or data-holding subsystem 404 in a shared enclosure, or such display devices may be peripheral display devices.

When included, communication subsystem 40$ may be configured to communicatively couple computing system 400 with one or more other computing devices. Communication subsystem 408 may include wired and/or wireless communication devices compatible with one or more different communication protocols. As nonlimiting examples, the communication subsystem may be configured for communication via a wireless telephone network, a wireless local area network, a wired local area network, a wireless wide area network, a wired wide area network, etc. In some embodiments, the communication subsystem may allow computing system 400 to send and/or receive messages to and/or from other devices via a network such as the Internet.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A computing device, comprising:
a logic subsystem; and
a data-holding subsystem comprising instructions stored thereon that are executable by the logic subsystem to:
receive a depth image representing an observed scene comprising a user;
detect a representation of the user in the depth image;
determine an adjusted body model based on a comparison between an initial body model and the representation of the user;
output to a display device a representation of the adjusted body model; and
output to the display device a time-varying representation of the adjusted body model based on a comparison between the adjusted body model and one or more previous instances of the adjusted body model.

2. The computing device of claim 1, wherein the initial body model comprises a selected pre-defined body model selected from a plurality of pre-defined body models.

3. The computing device of claim 1, wherein the representation of the adjusted body model comprises an avatar.

4. The computing device of claim 3, wherein the avatar comprises representations of one or more features of the user based on one or more visible light images.

5. The computing device of claim 1, wherein the instructions are further executable to:
store the adjusted body model on a remote device, and
receive the one or more previous instances of the adjusted body model from the remote device.

6. The computing device of claim 1, wherein the instructions are further executable to provide a comparison between one or more body measurements and one or more previous instances of the one or more body measurements, the one or more body measurements being determined based on the adjusted body model.

7. The computing device of claim 1, wherein the instructions are executable to determine the adjusted body model based upon the representation of the user in one or more of a pre-defined pose and a pose other than a pre-defined pose.

8. On a computing device, a method for monitoring changes in body shape and size, the method comprising:
receiving a depth image representing an observed scene comprising a user;
detecting a representation of the user in the depth image;
producing an adjusted body model based on a comparison between an initial body model and the representation of the user;
output to a display device a representation of the adjusted body model; and
output to the display device a time-varying representation of the adjusted body model based on a comparison between the adjusted body model and one or more previous instances of the adjusted body model.

9. The method of claim 8, wherein the initial body model comprises a selected pre-defined body model selected from a plurality of pre-defined body models.

10. The method of claim 8, wherein the representation of the adjusted body model comprises an avatar.

11. The method of claim 10, wherein the avatar comprises representations of one or more features of the user based on one or more visible light images.

12. The method of claim 8, further comprising:
storing the adjusted body model on a remote device, and
receiving the one or more previous instances of the adjusted body model from the remote device.

13. The method of claim 8, further comprising providing a comparison between one or more body measurements and one or more previous instances of the one or more body measurements, the one or more body measurements being determined based on the adjusted body model.

14. The method of claim 8, further comprising producing the adjusted body model based upon the representation of the user in one or more of a pre-defined pose and a pose other than a pre-defined pose.

15. A computing device, comprising:
a logic subsystem; and
a data-holding subsystem comprising instructions stored thereon that are executable by the logic subsystem to:
receive a depth image representing an observed scene comprising a user in a pre-defined pose;
detect a representation of the user in the depth image;

determine an adjusted body model based on a comparison between a selected pre-defined body model selected from a plurality of pre-defined body models and the representation of the user; and output to a display device a time-varying representation of an avatar based on a comparison between the adjusted body model and one or more previous instances of the adjusted body model.

\* \* \* \* \*